United States Patent [19]
Guthrie

[11] Patent Number: 5,565,858
[45] Date of Patent: Oct. 15, 1996

[54] ELECTRONIC INVENTORY SYSTEM FOR STACKED CONTAINERS

[75] Inventor: Warren E. Guthrie, Glen Ellyn, Ill.

[73] Assignee: Northrop Grumman Corporation, Los Angeles, Calif.

[21] Appl. No.: 306,051

[22] Filed: Sep. 14, 1994

[51] Int. Cl.[6] .................................................. H04B 7/00
[52] U.S. Cl. ........................... 340/825.350; 340/825.490; 340/825.540; 235/385
[58] Field of Search .................. 340/825.35, 825.49, 340/825.54, 572; 364/403; 235/385; 342/357; 367/6

[56] References Cited

U.S. PATENT DOCUMENTS

| | | | |
|---|---|---|---|
| 3,426,326 | 2/1969 | Goldstein | 340/823.35 |
| 3,805,265 | 4/1974 | Lester | 340/825.49 X |
| 4,070,671 | 1/1978 | Morrow | 367/6 |
| 4,525,713 | 6/1985 | Barletta et al. | 340/825.54 |
| 4,636,950 | 1/1987 | Caswell et al. | 364/403 |
| 4,651,150 | 3/1987 | Katz et al. | 340/825.34 |
| 4,673,932 | 6/1987 | Ekchian et al. | 340/825.54 |
| 4,688,026 | 8/1987 | Scribner et al. | 340/572 |
| 4,796,209 | 1/1989 | Burk | 364/559 |
| 4,827,395 | 5/1989 | Anders et al. | 340/825.54 X |
| 4,845,492 | 7/1989 | Cobb et al. | 340/825.490 |
| 4,862,160 | 8/1989 | Ekchian et al. | 340/825.54 |
| 4,888,709 | 12/1989 | Revesz et al. | 340/825.35 X |
| 5,005,125 | 4/1991 | Farrar et al. | 364/403 |
| 5,091,713 | 2/1992 | Horne et al. | 340/541 |
| 5,099,226 | 3/1992 | Andrews | 340/572 |
| 5,124,699 | 6/1992 | Tervoert et al. | 340/825.31 |
| 5,194,856 | 3/1993 | Zijlstra | 340/825.35 |
| 5,225,842 | 7/1993 | Brown et al. | 342/357 |
| 5,426,423 | 6/1995 | Raimbault et al. | 340/825.35 |
| 5,512,902 | 4/1996 | Guthrie et al. | 342/357 |

*Primary Examiner*—Edwin C. Holloway, III
*Attorney, Agent, or Firm*—Terry J. Anderson; Karl J. Hoch, Jr.

[57] ABSTRACT

A device which locates a container from a group of containers utilizing an electronic tag, the electronic tag is capable of being positioned in close proximity to one of the containers. The electronic tag includes at least one long range transceiver portion and at least one short range transceiver portion. Each long range transceiver portion is capable of communicating with either a short range transceiver portion associated with another electronic tag, or an interrogator unit. Each short range transceiver portion is capable of communicating with a long range transceiver portion of another electronic tag. The device assists in locating a container, relative to other containers, when the containers are stored in a stacked or nested configuration. A global positioning system (GPS) can be utilized to locate the position of the containers on the Earth's surface.

27 Claims, 11 Drawing Sheets

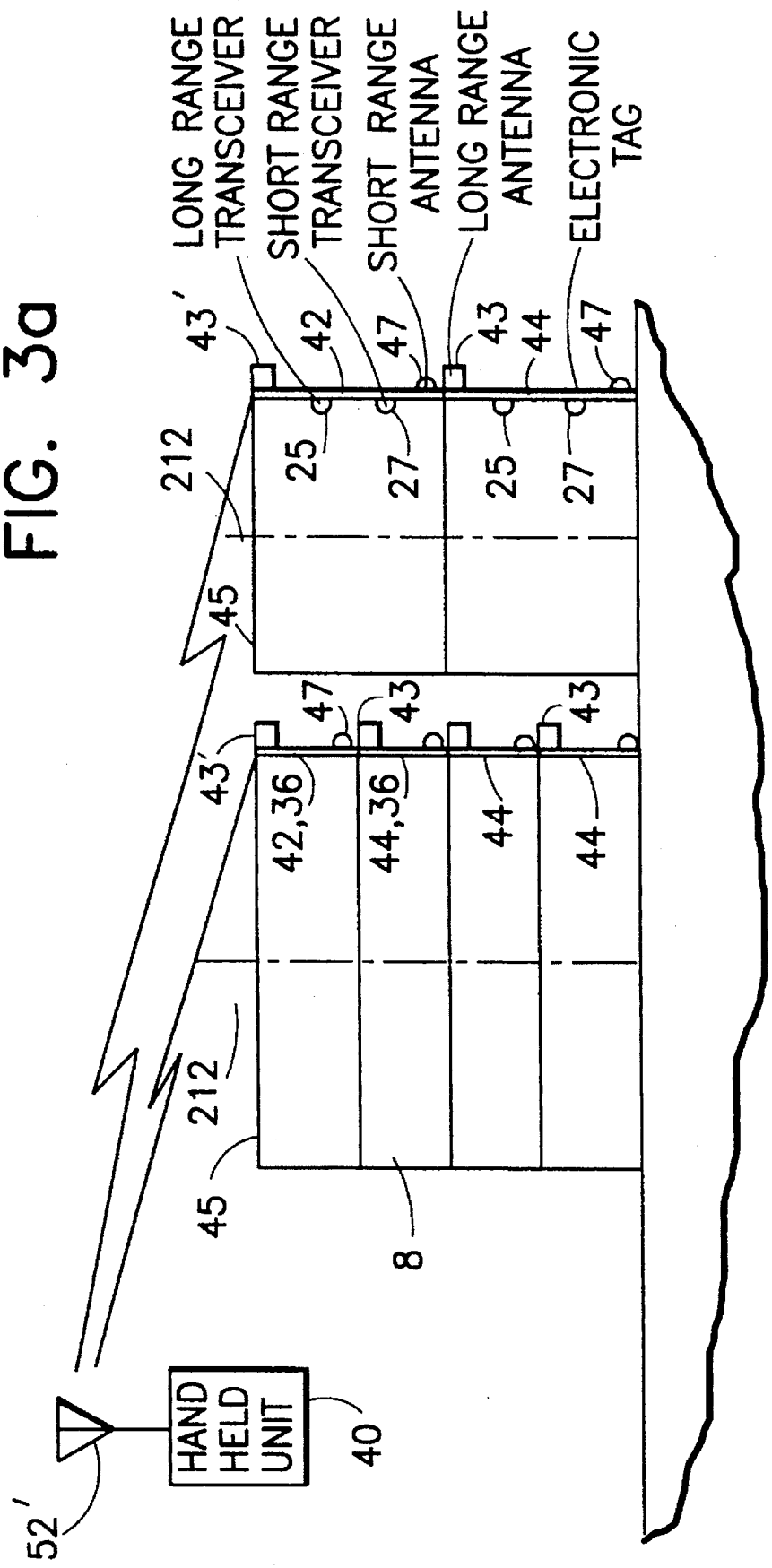

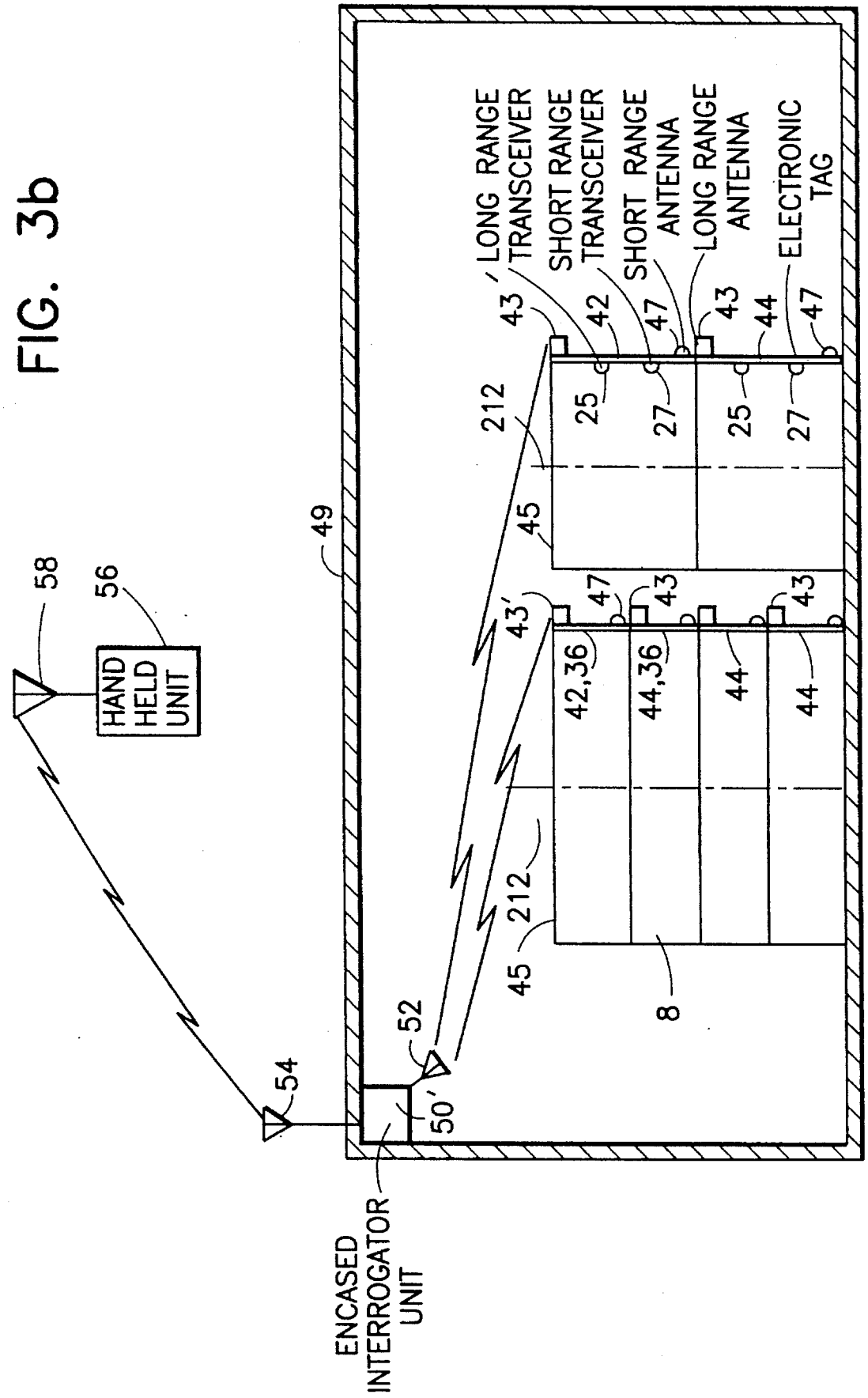

ELECTRONIC INVENTORY SYSTEM FOR STACKED CONTAINERS

FIELD OF THE INVENTION

The present invention relates to an electronic inventory system, and more particularly to a system which uses electronic tags to locate a particular container stored within a plurality of containers, stored in a stacked or nested configuration.

BACKGROUND OF THE INVENTION

In recent years, more and more goods are being shipped and transported by ship, aircraft, truck, train, etc. This tendency has become accelerated due to several factors which include increases in distances between the producers; the "just in time" manufacturing techniques where inventories are limited and producers accept goods only when they are necessary; and increased affluence of many people all over the world who can now afford to purchase and consume more. This trend has caused large demands to be placed upon the transportation industry. It is now highly desirable to provide more efficient transportation techniques.

One nemesis of effective cargo transportation is misplacing cargo. The time required to search for the misplaced cargo not only consumes valuable manpower, but also can cause the cargo to spoil or become obsolete. The balance between providing effective transportation of large quantities of goods and guarding against misplacing considerable amounts of goods is often quite delicate.

One efficient technique used to store containers such as shipping containers within a limited space is nesting containers (where a plurality of smaller containers fit within one larger container.) Unfortunately, it is quite easy to forget the location of nested goods, and the shipper is uncertain of which larger container some cargo is stored in. Nesting requires an efficient inventory system to be able to relocate cargo. Providing an inventory list of all of the cargo stored in all of the containers for larger volume nesting applications requires considerable time to compile, is very tedious to produce, and is often very difficult or unreliable to use efficiently.

Another technique to efficiently store cargo is stacking. Stacking is optimally utilized when the containers are of similar size and shape, and are configured to permit stacking. When large amounts of cargo are stacked, prior art techniques require considerable inventory logs to recall where each container is stacked. In such applications as container or cargo ships (where there are a large number of containers stacked in each column, there are a large number of columns in each ship, and the cargo appears very similar) the task of recalling inventory becomes especially challenging.

A tool which has proven itself useful in many applications of locating objects is electronic tagging. Each electronic tag is capable of containing inventory information. Electronic tags in the past have been applied only to individual items, with no interaction between the tags. When a plurality of items containing such electronic tags are arranged in close proximity, it becomes very difficult to precisely position each electronic tag (and the cargo associated therewith) with respect to other containers in which it is nested or stacked such that the precise location of the stored object associated with the electronic tag could be determined. Additionally, some containers provide a barrier between certain electronic tags and a hand-held unit which is used to locate the container which the tag is affixed to. This barrier may block one or more of the transmitted signals, thereby making precise locating of a specific cargo container (or some inventoried contents located therein) very difficult.

Another difficulty is that when inventoried cargo is restacked and/or renested, the relative positions of the cargo changes. Maintaining a manual inventory list in its latest configuration as certain cargo is restacked or renested becomes a considerable challenge, which leads to potential error and confusion.

It would be desirable to provide some system which precisely locates, or at least is able to gain access to some precise positional information, when an electronic tag is affixed to a cargo container which is stored in a nested or stacked configuration. This precise positional information should be able to be updated automatically when the cargo is restacked or renested.

SUMMARY OF THE INVENTION

The present invention relates to a device which locates an object, utilizing an electronic tag, the electronic tag is capable of being positioned in close proximity relative to the container. The electronic tag includes at least one long range transceiver portion and at least one short range transceiver portion. Each long range transceiver portion is capable of communicating with either a short range transceiver portion from another electronic tag, or an interrogator unit. Each short range transceiver portion is capable of communicating with a long range transceiver portion which is associated with another electronic tag.

BRIEF DESCRIPTION OF THE DRAWING FIGURES

FIG. 3a is a schematic illustration of stacking containers with one embodiment of electronic tags of the present invention, which utilizes an "Index Configuration";

FIG. 3b is a schematic illustration of nesting containers with one embodiment of electronic tags of the present invention, which also utilizes an "Index Configuration";

FIGS. 4, 4A and 4B are a schematic flow-chart of one embodiment of the slave command logic which will be used by the interrogator unit and the electronic tags in locating a relative position of an electronic tag unit;

DETAILED DESCRIPTION OF THE PRESENT INVENTION

Figure 1:
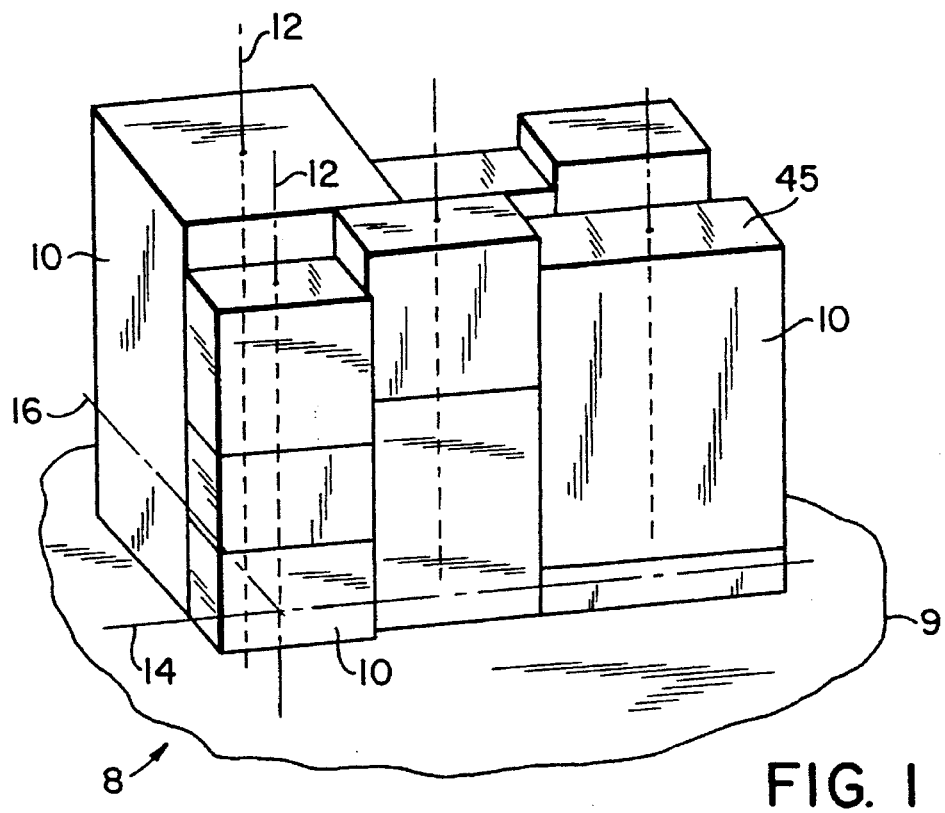
FIG. 1 is a prior art storage arrangement of containers known as stacking of the containers.

In this disclosure, elements which perform similar functions in different embodiments may be provided with identical reference characters. Precise stacking and nesting orientations, as well as frequencies, are intended to be illustrative in nature and are not intended to be limiting in scope. While radio frequency transmissions are illustrated, it is within the scope of the present invention that infrared transmissions could be utilized, especially for inter-tag linking. In brief, any suitable communication frequency may be utilized while remaining within the scope of the present invention.

The present invention system uses a modified arrangement of electronic tags to locate items when a large number of containers are stored in a stacked or nested configuration. Examples of such containers are storage containers which are stored in the hold of a ship, or in the wharves near where the ships are loaded; railway cars in a railway yard; trucking containers in a trucking yard; and in any other situation where many containers are stored in close proximity. This system especially applies to intermodal freight containers, pallets, stacked cartons, and advanced shipping enclosures configured for stacking or nesting.

FIG. 1 illustrates a prior art technique of stacking containers 10, in which a group of stacked containers 8 are located on a surface 9. In this Figure, containers 10 are arranged to form columns 12. In this specification, the containers may also be considered as being arranged in an array of rows 14 and layers 16. Irregular sizing of the containers 10 may make definition of the rows, columns and layers difficult. While the columns of FIG. 1 are vertically oriented, this is not necessary. In this disclosure, each of the terms "columns", "rows", and "layers" are oriented substantially perpendicular to each of the other two with no specific requirement as to orientation of any one of the three. In other words, the use of the terms "columns", "rows", and "layers" defines a generally orthogonal coordinate system.

Figure 2:
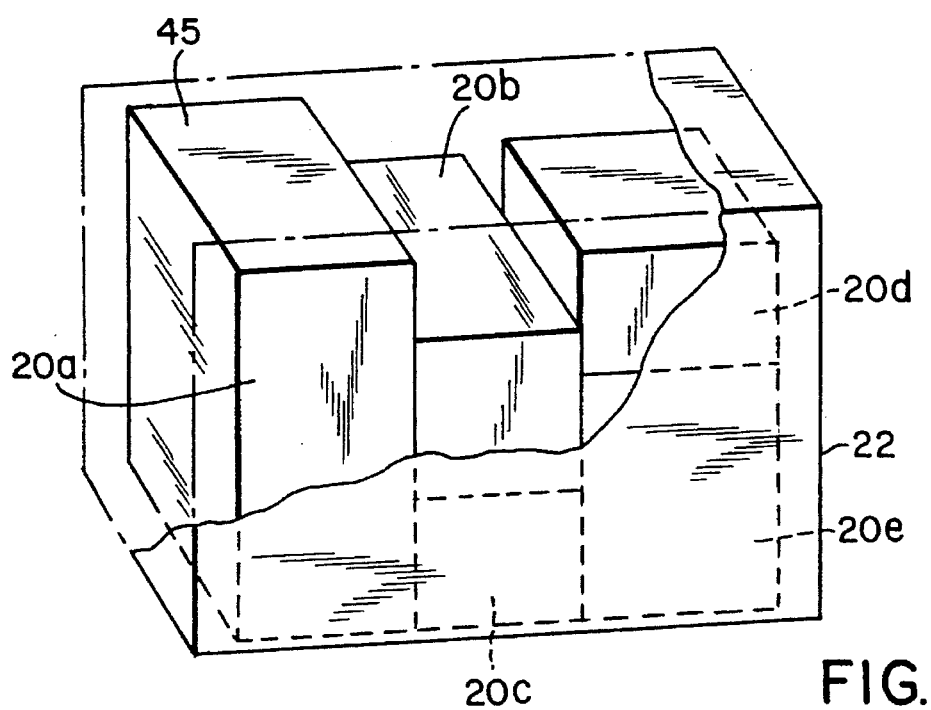
FIG. 2 is another prior art storage arrangement of containers known as nesting of containers.

FIG. 2 illustrates an alternate prior art technique of storing containers from that illustrated in FIG. 1 which is known as nesting. Nesting is defined as where one or more internal containers 20a, 20b, 20c, 20d, 20e are stored in a single, relatively large, outside container 22 (a segment of the outside container 22 is illustrated in phantom.) The only access to each of the internal containers is through the outside container 22. From an inventory point of view, the contents of the outside container 22 encompasses the contents of all of the internal containers 20a–20e.

Non-GPS Embodiments

Index Configuration

FIG. 3a and 3b illustrate two embodiments of electronic tags 36 of the present invention which do not involve the use of global positioning system (hereinafter referred to as "GPS") devices. FIG. 3a includes an interrogator unit 40 (which may be hand-held, or secured to a vehicle or foundation, located in a satellite, or any other suitable configuration depending upon the use of the system), a master electronic tag 42, and at least one slave electronic tag 44. Each master electronic tag 42 is structurally identical to, and interchangeable with, each of the slave electronic tags 44. Whether an electronic tag unit is identified as a master or slave depends only upon whether a long range antenna 43, 43' of the electronic tag is exposed to an external surface 45 (see FIGS. 1 and 2), or whether it is in close communication with a short range antenna of another electronic tag. Each long range antenna 43, 43' is configured to communicate with either the interrogator unit 40 or a short range antennas 47 of another electronic tag. The short range antennas 47 are configured to communicate with long range antennas 43 of other electronic tags. Since the master long range antenna 43' of the master electronic tag unit 42 is exposed to the exterior surface 45 of the container stack 8, the master long range antenna 43' may be considered as being "unblocked" (able to communicate with interrogator units which are located outside of the container stack 8.) The electronic tags 42, 44 in the FIG. 3a embodiment are configured to transmit along a single axis in the orthogonal coordinate system (parallel to either columns, rows, or layers) via their long range antennas.

The short range antennas 47 are configured for low gain and high transmission medium for high directionality so that when placed near an adjacent long range antenna 43, the short range antenna will establish a link only to the adjacent long range antenna, and no other long range antennas. This technique of linking tags on adjacent containers establishes a link from the master tag to an adjacent tag, and from that adjacent tag to the next adjacent electronic tag until all of the electronic tags in a particular column are linked.

The preferred embodiment links a single long range antenna to a single short range antenna by controlling the placement, gain, and radiation patterns of antennas. One embodiment (not illustrated) utilizes short range antennas which closely interfit with adjacent long range antennas such that the short range antennas effectively shield the adjacent long range antennas from receiving signals from any other short range antenna. A configuration such as this is necessary to limit the establishment of more than one communication links associated with a single long or short range antenna.

Should a particular tag establish more than one link over its long or short range antenna, several measures may be taken to mitigate the effects of the multiple links. One technique is to compile a list of all of the tags (utilizing the list compiled in each column from the master electronic tag), and remove all signals from tags which have been counted more than once. Another technique is to permit a slave tag to establish only one link to another tag from either it's long range or short range antenna, so that the inventory from the tag can be counted only once in the master tag inventory.

Each electronic tag unit 42, 44 contains a long range transceiver 25 which is capable of transmitting over a long range antenna 43 or 43', and a short range transceiver 27 which is capable of transmitting over the short range antenna 47. Each antenna (both long and short range) is capable of defining one side of a two-way RF data communication link. Each body portion 48 contains electronic hardware and/or software which controls the transmission of signals from either or both the long range antenna and/or the short range antenna in a manner as described below, and stores the particular information about inventory of the container which the electronic tag is associated with, and possibly other electronic tags. It is envisioned that monolithic microwave integrated circuit technology, which is generally known in the art, may be utilized in this application. This application requires a two way data link, and also a technique to read and write data transmissions. Stored data relating to the inventory of the container associated with each electronic tag unit 42, 44 is read into the electronic tag unit, and stored in long term memory, by use of a wireless remote device in a manner such as is known in the art. For example, if the user of the system is placing aspirin in a specific container, they will input a code for aspirin (such as the word "aspirin"), as well as a code for the specific container into the wireless. This data information will be input into the long term memory of the electronic tag associated with the container.

The stacking or nesting of containers will position one long range antenna 43', for each column 212 on a peripheral side 45 which faces the integrator unit 40, so that it is unblocked from the interrogator unit. This long range antenna becomes the master antenna 43' for that column. The electronic tag which is associated with the master antenna 43' becomes the master electronic tag 42. The master electronic tag will obtain cumulative positional and item inventory information of all of the electronic tags 36 of the containers in that column utilizing the following technique. In the "Index Configuration" embodiment of the present invention, the master electronic tag contains information about how far away from the master electronic tag 42 (how many tags) the stored inventory is (for example, a specific master electronic tag is the master electronic tag which is associated with the column which the desired specifically identified cargo is associated with, and the desired cargo is contained a certain number of electronic tags below the master electronic tag.)

Each short range antenna 47 is configured to generate and receive radiation of such a wavelength and power that it will not be able to pass through the material of the containers and/or the electronic tags. The long range antennas are sized to generate radiation of a wavelength which is capable of passing though perhaps one or two containers. The specific power applied to the antennas can be empirically determined, and will vary depending upon the nature of the containers being stacked.

The short range antenna 47 of each master or slave electronic tag 42, 44 is positioned such that it is very close to the long range antenna 43 from the adjacent slave electronic tag 44. The tags must be configured to conform to each container while permitting stacking of the containers. Further stacking of containers sequentially positions all long range antennas 43 (except the master long range antenna 43') next to the short range antennas 47 of the container above it, as illustrated in FIG. 3a.

Additionally, a short range antenna 42 which is located on the lowest stacked or nested container is not in close proximity to any long range antenna (since there is no adjacent container nor associated tag located below the lowest one.) Therefore, if the short range antenna of master electronic tag 42 transmits an interrogation signal to the long range antenna 43 of the electronic tag 44 below it, and thereupon the short range antenna 42 of each electronic tag 44 transmits the interrogation signal in series to the long range antenna 43 of the electronic tag below it (in a manner that each lower electronic tag responds to a signal from the electronic tag above it); then when the lowest electronic tag (corresponding to the lowest container) is eventually reached, there will be no similar response from another electronic tag.

In this manner, the interrogation signal can be sent, in series, to each successive electronic tag associated with a neighboring container. The "interrogation" signal can be indexed so that each electronic tag is provided with an index number which relates how far from the master electronic tag that each electronic tag is (for example, the container which this electronic tag belongs to is in the same column as an identified master electronic, and it is six containers below that electronic tag.)

As soon as any electronic tag receives an interrogation signal from the interrogator unit 40 or the electronic tag above it, then the electronic tag will transmit a response signal over its long range antenna containing the transmitting tag's inventoried contents, which master tag is in the same column as the transmitting electronic tag, and how far below the master electronic tag that the desired electronic tag is located. The inventoried contents of the container associated with each electronic tag is stored in that electronic tag's long term memory, and is only changed when the contents of the container associated with that container is altered. Any other non-master electronic tag with a lower index number (closer to the master electronic tag) which is associated with the same master electronic tag, and receives the "response" signal over its short range antenna 47 will retransmit an identical copy of the "response" signal over its long range antenna.

The master long range antenna 43' for each column is the only antenna which is used to communicate with the interrogator unit 40. A first technique that ensures this is that the container and the antenna be configured such that the stacking or nesting of containers will substantially block all long range antenna transmissions (except for the master) so that the slave long range antennas are only capable of transmitting to the limited transmission range required to transmit to and from the associated short range antenna of the neighboring tags. As such, none of the long range antennas (except for the master) will be capable of communicating with the interrogator unit.

A second technique to ensure that the master is the only long range antenna capable of communicating with the interrogator unit 40 is that the container and the antenna design provides that stacking of a plurality of containers will substantially block emitted radiation from all short range antenna radiation from reaching all but the adjacent long range antenna; this may be accomplished by providing a very low transmit power to the short range antennas. Upon completion of the container stacking, a "self inventory" command is transmitted from the interrogator unit 40. The self inventory command is intended to be received by the master long range antenna 43' and all other long range antennas 43. Upon reception of the self inventory command, each respective tag transmits a "slave" command through its short range antenna. The master long range antenna is the only long range antenna which is not adjacent to a short range antenna 47, and therefore will not receive a slave command from a short range antenna.

Any electronic tag 42 associated with a long range antenna 43 which receives a slave command is now prohibited from responding to any command except those identified as being from the adjacent short range antenna 43. This process follows the logic that if an electronic tag does not receive a "slave" command soon after receiving a "self-inventory" command, it's long range antenna is not adjacent to a short range antenna, and therefore it is in contact with the exterior surface 45, and as such becomes a master long range antenna 43'. By comparison, those electronic tags which do receive a "slave" command soon after a "self inventory" command are not master electronic tags, and therefor became slave electronic tags 44. Slave electronic tags 44 are not controlled directly from the interrogator and will not transmit in response to interrogator commands.

Figure 4A:
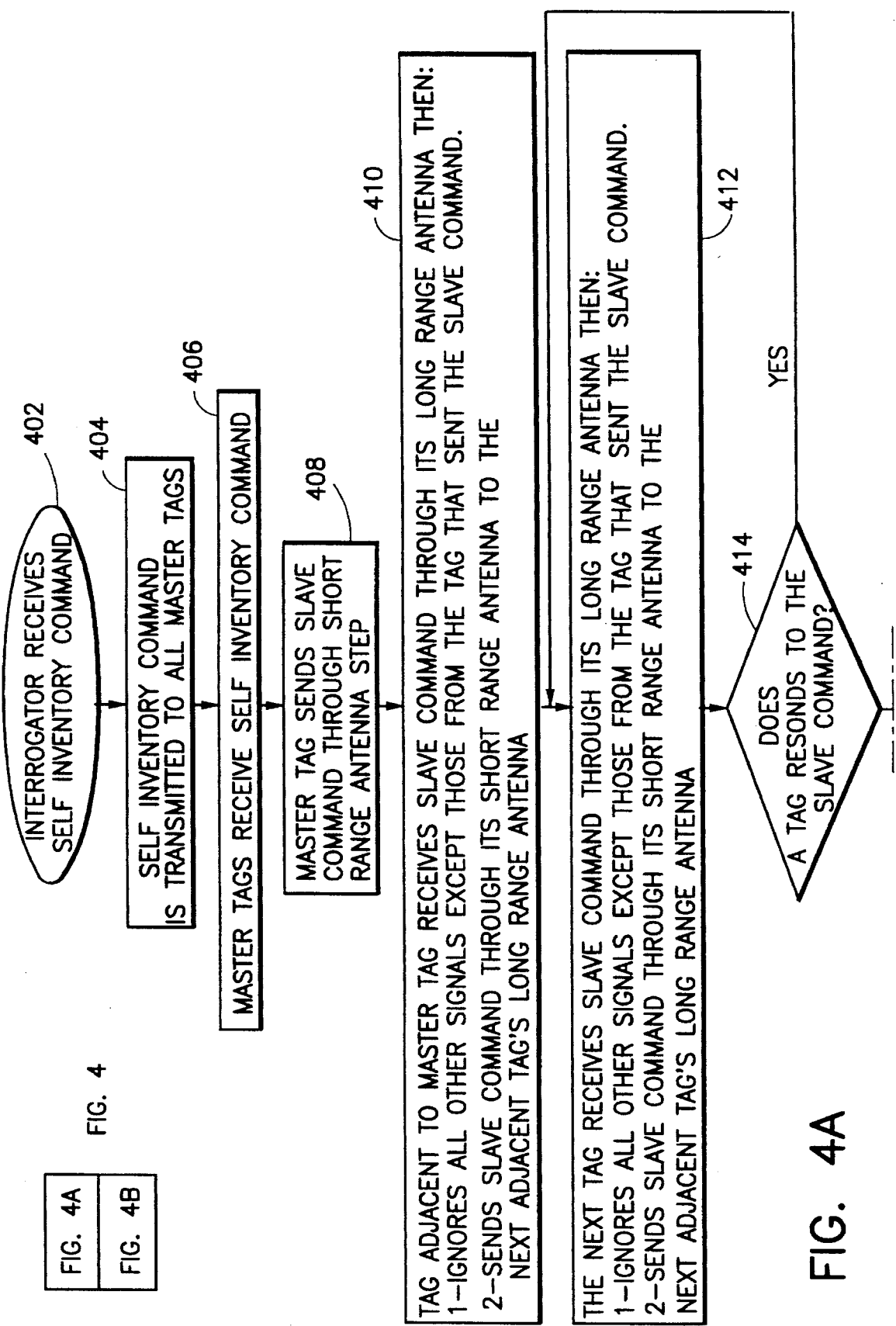
Figure 4B:
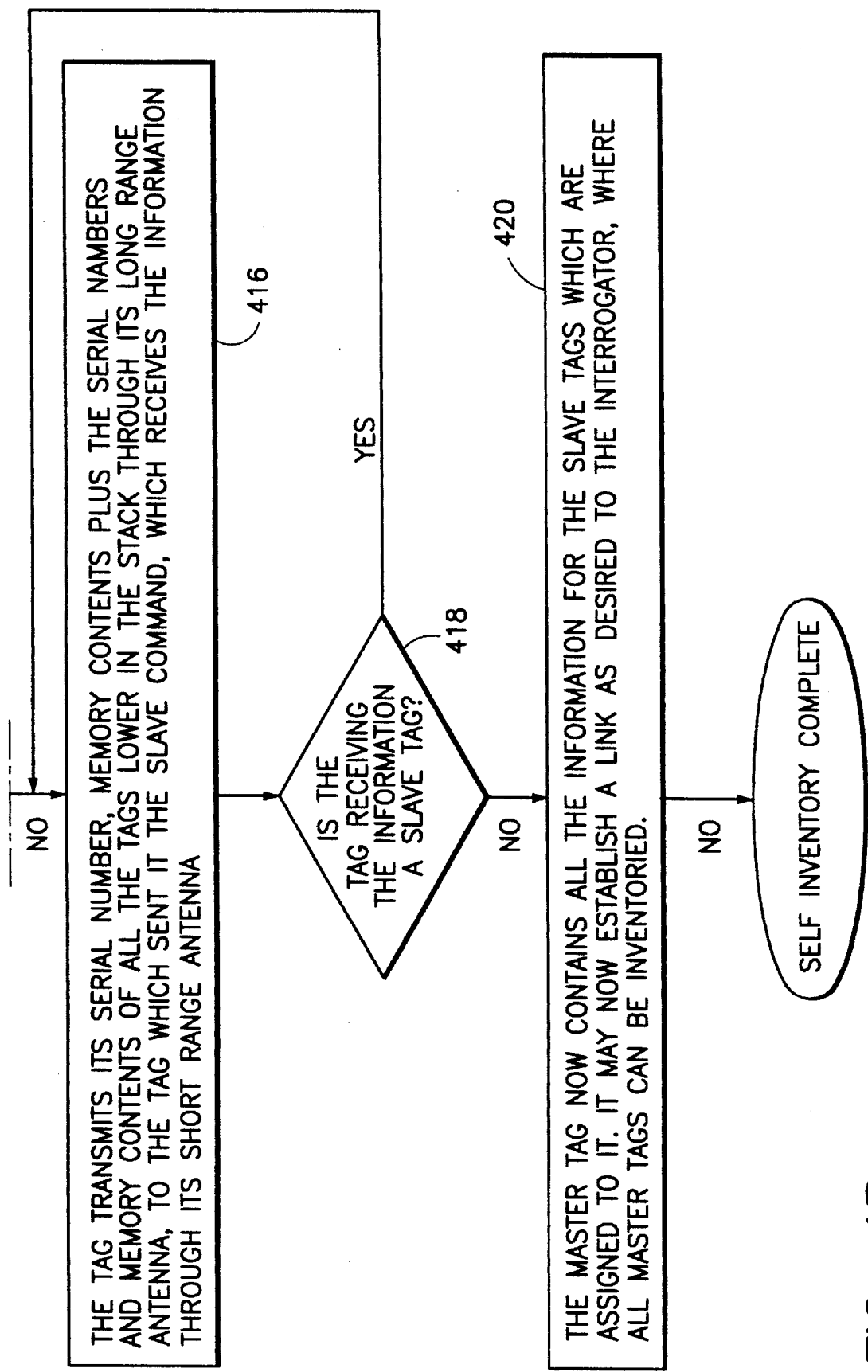

By performing the self inventory command (as illustrated in FIG. 4 and described later in the disclosure), a master electronic tag will have in its memory serial numbers, inventory contents, and any other desired information for all of the tags slaved to it. By including the master electronic tags memory, a listing of the order of the slave electronic tags, the relative location of each slave electronic tag (or the associated container) can be determined. In this manner, by communicating with the master electronic tags, the location and contents of all of the electronic tags may be determined (as well as the contents of the containers associated with all of the electronic tags.)

Using the above described interrogation signals and the response signals, electronic tags determine which one is the master electronic tag, which electronic tag corresponds to the lowest positioned container within a column, and what are the relative positions (referenced by index number) of each electronic tag which is associated with the master electronic tag within each column. All of this information is stored within the software of each master electronic tag 42 after a "response" signal is received.

The status of tags can be reversed (which tags are slaves and which are masters) by either receiving another "self inventory" command and performing the above interrogation signal—response signal as outlined, or by receiving an "unslaved" command.

The "unslaved" command allows another long range antenna (or set of long range antennas) to become the master. This change of master antenna may be desirable if there is a change of position of where the interrogator unit is positioned. The "un-slaved" command becomes essential if the containers are repositioned relative to one another. Following the "unslaved" command is typically another "self-inventory" command.

FIG. 3b is identical to FIG. 3a except that FIG. 3b illustrates a nested configuration in which the container stacks 8 are nested inside a larger nesting container 49. Additionally, an encased interrogator unit 50 is shown in FIG. 3B, which has an interior antenna 52 which receives signals from, and transmits signals to, the master tag 42. The interior antenna 52 functions identically to the antenna 52' of the interrogator unit 40 in the FIG. 3a embodiment.

A remote interrogator unit 56 with antenna 58 applies signals to an external antenna 54 of the encased interrogator unit 50. The encased interrogator unit 50 has software to permit it to apply interrogator commands to the master tags 42 of FIG. 3b, and stores the resulting positional information. In effect, the encased interrogator unit 50 becomes a master for the master tags 42 in the FIG. 3b embodiment.

Cross Fix Configuration

While the embodiment described in the Index Configuration portion of the present invention (FIGS. 3a and 3b) determines how far from a specific master electronic tag that a desired electronic tag is; another embodiment permits locating an electronic tag 142 using cross fixes from a plurality of orthogonal surfaces. In this configuration, illustrated in FIG. 11, an interrogation signal is initially applied to all of the master tags 143a (associating a first direction as defining columns 12a) until one master tag 143a' is identified as being the master tag associated with the desired electronic tag affixed to (and containing) the desired electronic inventory. Then a similar process will be applied defining a second direction as corresponding to columns 12b involving a plurality of master tags 143b until the specific desired master electronic tag 143b' is located. The locations of the desired electronic tag 142 is determined by cross fixing the locations of the resulting master electronic tags 143a', 143b'.

While the Index Configuration requires the electronic tag to provide information about the index of each electronic tag (how many electronic tags away from the master tag each slave is), the Cross Fix Configuration requires no such software. The Cross-Fix Configuration however requires that the cargo be stored in a regular, stacked, configuration such that the non-master long range antennas be in close proximity to the neighboring short range antenna. It is also necessary that the electronic tags be capable of functioning along two axes to obtain a cross fix. This may be accomplished either by providing a two or three dimensional tag which operates along a separate axis, or by providing two or three sets of uni-axis electronic tags; each set will be operated successively.

The purpose of self inventory commands may be to search for contents of the same container from another direction (different surfaces are considered as the exterior surface 45 during each search of the cross-fix configuration), in case the position of the container could not be deduced from the first "self inventory" command, or else to determine a cross-fix location of the sought container to determine the easiest access to the sought container as in the Cross-Fix Embodiment.

Electronic Software

FIG. 4 illustrates a schematic illustration of one embodiment of the software contained in each electronic tag which is associated with the "interrogation" signal which will be provided from each master electronic tag 42 to each following slave electronic tag 44 in the stacking version of the "Index Configuration" embodiment of the present invention (illustrated in FIG. 3a.) In an "Interrogator Receives Self-Inventory" Command 402, the user of the system provides a command to the interrogator unit 40 (which may be hand held, affixed at some earth-bound location, or located in a satellite) to transmit the self-inventory command. The technique for activation of the interrogator unit is peculiar to each specific system. In a "Self Inventory Command Is Transmitted To All Master Tags" Command 404, the self-inventory command is transmitted from the interrogator unit.

In a "Master Tag Receives Self Inventory" Command 406, the long range antenna 43' of the master electronic tag 42 receives the self-inventory command, and the master electronic tag stores the command in memory. At this point, since both the long range antenna of the master electronic tags 42 and the long range antenna of some of the slave tags may have received the self-inventory command from the interrogator unit, the identity of the master tag has not been determined. In a "Master Tag Sends Slave Command Through Short Range Antenna" Step 408, each tag which has received the self inventory command through its long range antenna transmits the slave command through its short range antenna 47.

In a "Tag Adjacent To Master Tag Receives Slave Command Through Its Long Range Antenna" Step 410, the long range antenna of the slave electronic tag 44 receives a slave command, which has been transmitted over the short range antenna 47 of the adjacent tag. The slave electronic tag thereupon transmits a slave command to the next adjacent slave electronic tag 44 over its short range antenna 47 utilizing "The Next Tag Receives Slave Command Through Its Long Range Antenna" Step 412. In this manner, the slave command is repeated over the short range antenna of each of the slave tags 44. All slave commands are thereby transmitted over the short range antennas 47 of either the master tag 42 or another slave tag 44. The only tags which will not receive a slave command are the master tags 42.

During a "Does A Tag Respond To The Slave" Command 414, each slave electronic tag 44 which receives a slave command over its long range antenna also transmits a receipt command over its long range antenna. Therefor, each master or slave electronic tag which transmits a slave command over its short range antenna, can also expect to receive a receipt command over its short range antenna soon thereafter. If a master or slave antenna does not receive such a receipt command, it assumes that it is the lowest tag in the column. At this point, each tag knows whether it is a master tag, a slave tag, and whether there are any other tags located below it. This information can thereupon be transmitted to the electronic tag above it, and eventually to the master electronic tag.

During Step 416, each slave tag transmits its serial number, memory contents, plus any additional desired information. Similar information relating to the slave electronic tags which are located lower in the stack through its long range antenna to the tag which transmitted its slave command (as determined in steps 410 and 412.) During an Is The Tag Receiving The Information A Slave Tag Step 418, each master or slave electronic tag which is receiving a signal from its next lower slave tag (if one exists) is determining whether to transmit the same information to the tag above it based upon whether the electronic tag is a slave or a master. If the electronic tag is a slave, then the purpose of Step 418 is simply to transfer whatever information it receives from the electronic tags below it in the same column (plus more information relating to that particular slave electronic tag 44) to the master or the slave electronic tag above it. If the electronic tag is a master tag, the purpose of Step 418 is to store all of the information it receives such that it can transmit the information back to the interrogator unit if necessary (during a Step 420.)

It should be emphasized that both the master and slave electronic tags contain all of the software necessary to be either a master electronic tag or a slave electronic tag. This is important because the only difference between the slave electronic tags and the master electronic tags (plus all the antennas associated therewith) is where the electronic tag is located with respect to other electronic tags. When an electronic tag is made a slave tag, it will only respond to commands from its master tag and/or the adjacent slave tag.

Stacked containers will perform an automatic self-inventory function which is compatible with the self-inventory function discussed above. Upon reception of the self-inventory command, the master tag transmits a command through it's short-range antenna to the adjacent tag. The adjacent tag responds in two ways:

1. Transmitting serial number plus electronic memory contents back to the master tag.
2. Commanding the next adjacent tag to return serial number plus electronic memory contents and to do likewise to the next adjacent tag.

Nesting refers to where containers are placed inside other larger containers as illustrated in FIG. 2. The encased interrogator unit 50 utilized in a nesting configuration of FIG. 3b rolls the electronic memory from all smaller containers 8 nested inside of a larger container 49, into the larger container's memory. There are two ways for this to be accomplished:

1. As each smaller container is loaded into the larger, the contents of the smaller container's electronic memory is requested by an interrogation unit and stored. Upon completion of loading, the interrogation unit transmits the sum of all smaller containers memories to the larger container's tag.
2. When the smaller containers 8 are nested inside of the larger container, an antenna 52, of the encased interrogator unit 52 of FIG. 3b is located within the larger container 49 (which may be equaled to the master tag of the stacking configuration) transmits a polling signal. Upon receipt of this polling information, each long range antenna of the smaller containers respond with an electronic signal describing the cargo of each of the smaller containers 8. The master electronic tag 42 stores all of these signals in a manner known in the art.

The containers may be automatically inventoried by an interrogator in both the nesting and the stacking embodiments. The automatic inventory function causes the electronic tag associated with the master antenna to acquire a list of all containers present, and may also compile the contents of the electronic memory from each tag.

Figure 5:
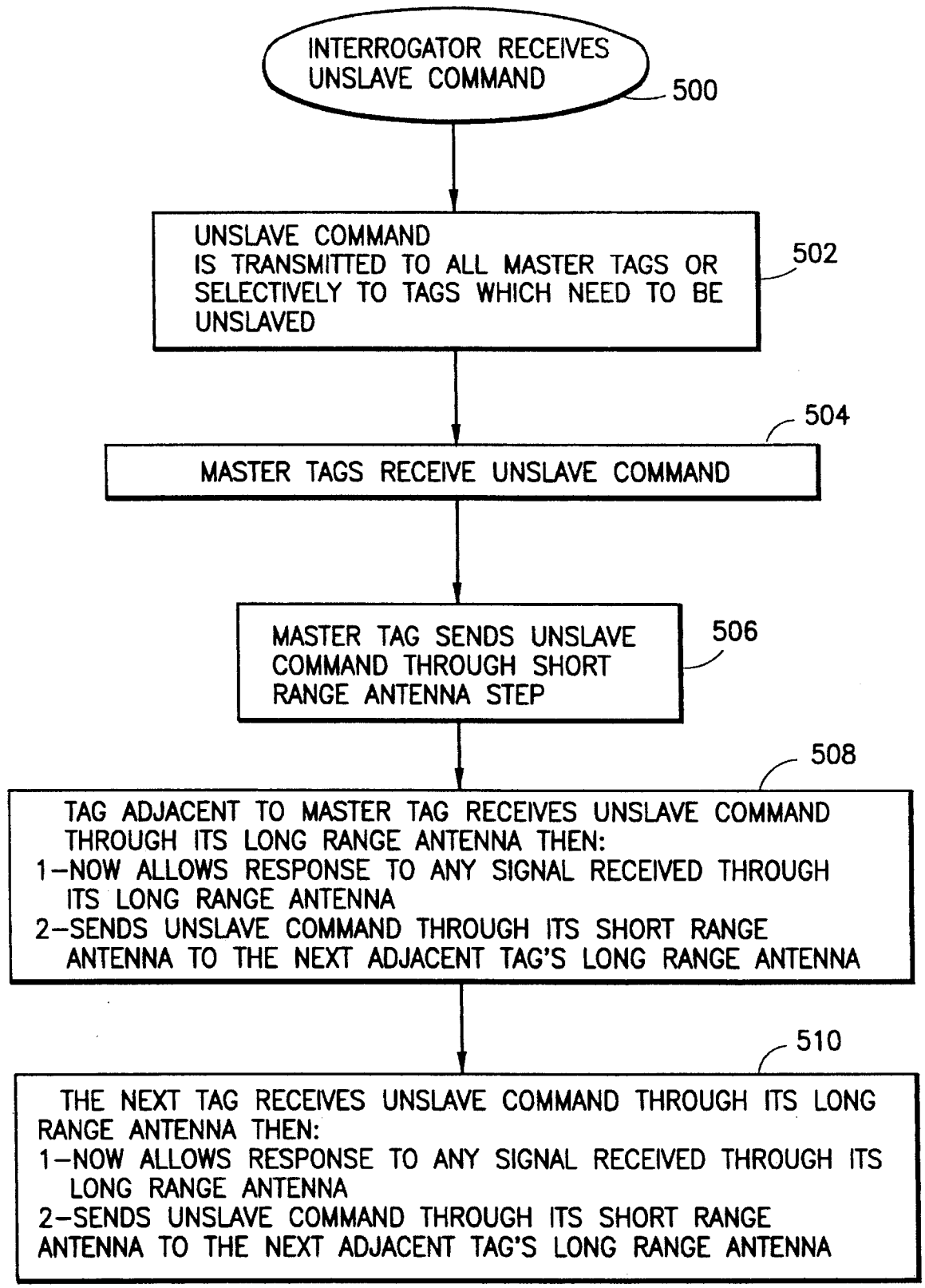
FIG. 5 is a schematic flow-chart of one embodiment of an un-slave command which is provided by an interrogator unit to the master and slave electronic tags.

FIG. 5 illustrates a schematic illustration of one embodiment of one progression of an "unslave command" signal which is provided from the master electronic tag 42 to each of its associated slave electronic tags 44 in the FIG. 3a stacked container version of the "Index Configuration" embodiment of the present invention. The unslave command is necessary when the containers (and the associated electronic tags) are being restacked or some of the containers are being removed such that the identity of the master electronic tags and/or the slave electronic tags may be altered. In the "Interrogator Received Unslave Command" Step 500, the interrogator unit 40 is actuated by the user to transmit an unslave command during a "Unslave Command Is Transmitted To All Master Tags Or Selectively To All Tags Which Need To Be Unslaved" Step 502.

During a "Master Tag Receives Unslave Command" Step 504, the master electronic tag 42 receives over its long range antenna 43' the command 502. During Step 506, the master antenna transmits over its short range antenna 47 the unslave command which is picked up by the long range antenna of the adjacent slave tag. When the adjacent slave tag 44 receives its unslave command, it disassociates itself with the master and/or the adjacent slave tag which it has been slaved to, and issues an unslave command to all tags which are slaved to it. The process of disassociating each of the master and the slave electronic tags is accomplished in steps 508 and 510.

While FIGS. 4 and 5 relate to the software at the electronic tags as applied to the "Index Configuration" embodiment of the present invention, similar, slightly modified software could be utilized relative to the "Cross-Fix Configuration" embodiment of the present invention.

The above system functions well when the user is in relatively close proximity to the cargo (containers) that is being searched for. However, when the user is remote from the cargo, some other technique becomes necessary to positively locate the position of the cargo relative to the user (the desired cargo is positioned at such a distance, on a certain radial, from the user and interrogator unit 40.) This additional positional function may be accomplished by using GPS techniques as described below.

GPS Systems

The following section contains similar structure to that illustrated in co-pending U.S. patent application Ser. No. 08/229,244, filed Apr. 18, 1994, now U.S. Pat. No. 5,512,902, entitled "Stock Locator System Using GPS Translator", assigned to the present assignee, and invented by W. Guthrie et al.

Figure 6:
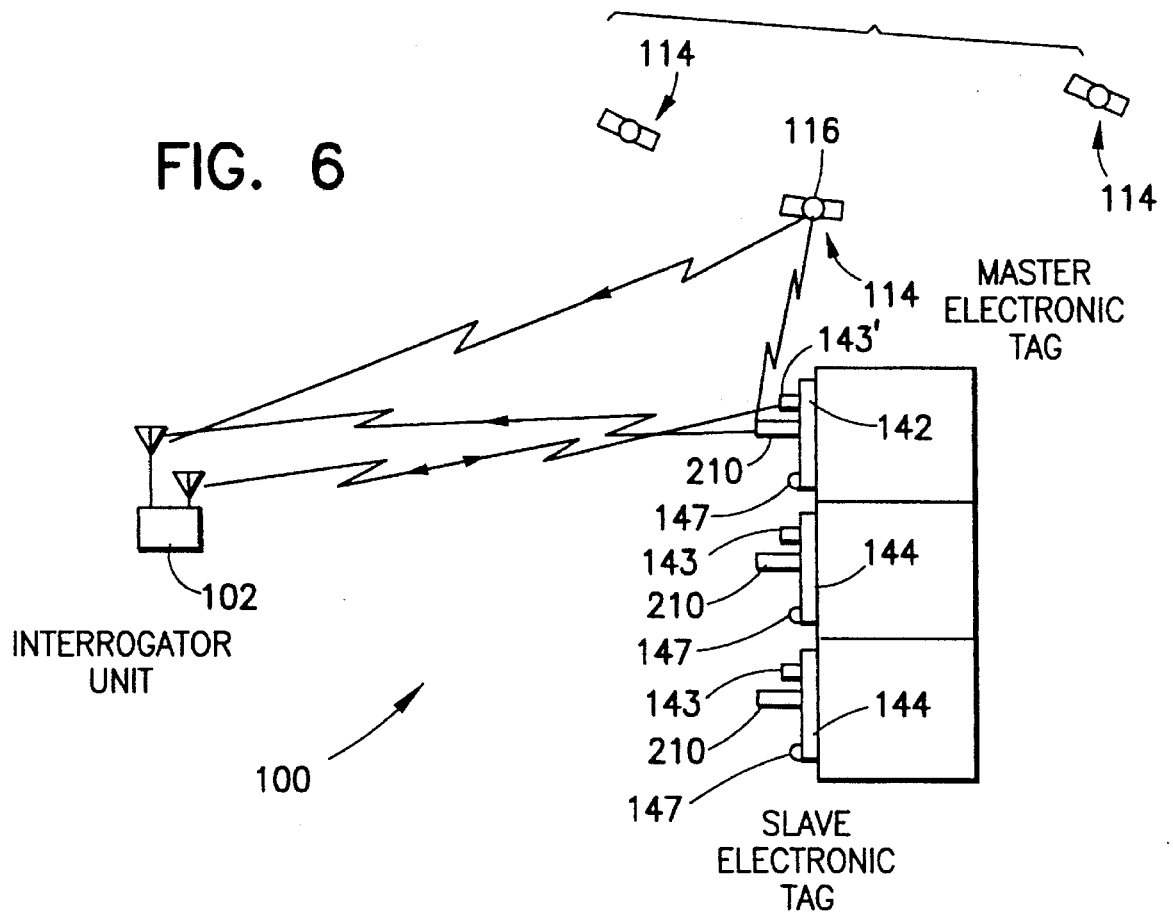
FIG. 6 is an alternate embodiment of stacked container locator system from that illustrated in FIG. 3a, which uses GPS for positional information.
Figure 11:
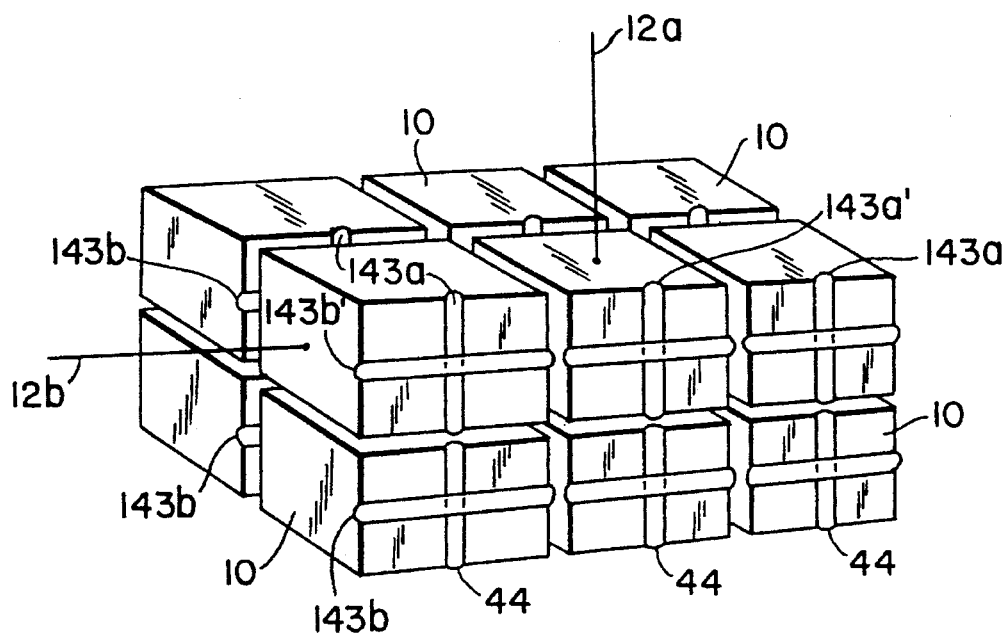
FIG. 11 is a schematic similar to FIG. 3, in which the location of an electronic tag is determined utilizing a "Cross-Fix Configuration".

The FIGS. 6–10 embodiments of the present invention, in comparison to the FIGS. 3a, 3b and 11 embodiments, utilize a GPS system. The former embodiments transmit a relative location of the desired cargo with respect to the interrogator unit or the Earth (the cargo is located 200 feet north and 1 mile east of your present location, for example.) The later embodiments transmit an identity of the master tag(s) of the present electronic tag and the relative position with respect thereto (the cargo is located three tags underneath a specific master tag.) In FIG. 6, a stacked or nested container locator system 100 contains an interrogator unit 102; a master electronic tag 143'; and associated slave electronic tags 143 which communicate with the interrogator unit 102 over an "RF" link; a GPS translator 210 associated with each master electronic tag 143' and slave electronic tag 144, three or more GPS transmitters 116, each located aboard a distinct GPS satellite 114. The GPS transmitters 116 are required to precisely locate a GPS receiver by triangulation. Assorted antennas 143, 143', 147, 110, 111, 112, 113, 240, and 270 (see FIGS. 7–10) are also provided. Antennas 110, 111, 112, and 113 are GPS antennas which utilize signals transmitted from GPS transmitters 116 (typically located aboard GPS satellites 114.) Antenna 143' can transfer information over the RF communication link with interrogator unit 102. The function of the long range antennas 143, 143' and the short range antenna 147 are similar to the respective long range antennas 43, 43' and the short range antennas 47 of FIGS. 3a and 3b. However, when the master long range antenna 143' is actuated, a GPS interface portion 220, described below, is also actuated. Therefore, in the FIGS. 6–10 embodiments, not only is the relative location of the electronic tag with respect to other electronic tags transmitted as described in the FIGS. 3a and 3b embodiments, but GPS positional information is also transmitted.

In order to obtain positional information using the container locator system 100, portions of which are illustrated in FIGS. 6–10, the following techniques are used. There are approximately 24 geo-stationary GPS satellites 114 which presently orbit the Earth. The distances from a GPS satellite 114 to a GPS receiver 120 (which is located in the interrogator unit 102) and/or the GPS translator 106, are determined by timing distinct signals travelling from a plurality of GPS transmitters 116 located on the GPS satellites 114 to the receiver 120 (or the GPS translator 106.) The GPS translator 106 translates the frequency of the signal it receives into a frequency band which can be picked up by the interrogation unit, and retransmits it as a distinct GPS signal over the antenna 113.

The interrogation unit 102 receives two distinct GPS signals from the GPS transmitter 116 located on each satellite 114. The first signal is a direct signal from the GPS satellite. The second signal is the (frequency) translated signal which has travelled from the GPS satellite 114 to the GPS translator 106 contained in a remote module 210 where the frequency is altered and retransmitted to the interrogation unit 102 over antenna 113 (see FIG. 7). The communication links associated with the GPS transmissions are illustrated between only one GPS satellite 114, one remote module 210, and one interrogation unit 102 in FIG. 6 for ease of illustration; however, similar communication links can be developed from each GPS satellite which is in a correct position to determine a communication link to be set up, as dependant upon the configuration of the system.

Precise distance information from any GPS satellite 114 can be obtained by a GPS receiver 262 (and 262" in the FIGS. 9 and 10 embodiment) located in the interrogator unit 102, either directly or via translator 106. The accurate position in space of the GPS receiver 120 (or translator 106) can be determined by triangulation using multiple GPS satellites in a manner well known in the art. The triangulation requires that both the receiver 120 and the translator 106 both be in communication with at least three common GPS satellites at one given time. Relative GPS techniques as described below can be used to determine the relative position of the translator (which is contained within the remote module) relative to the receiver (which is contained within the interrogation unit).

Figure 7:
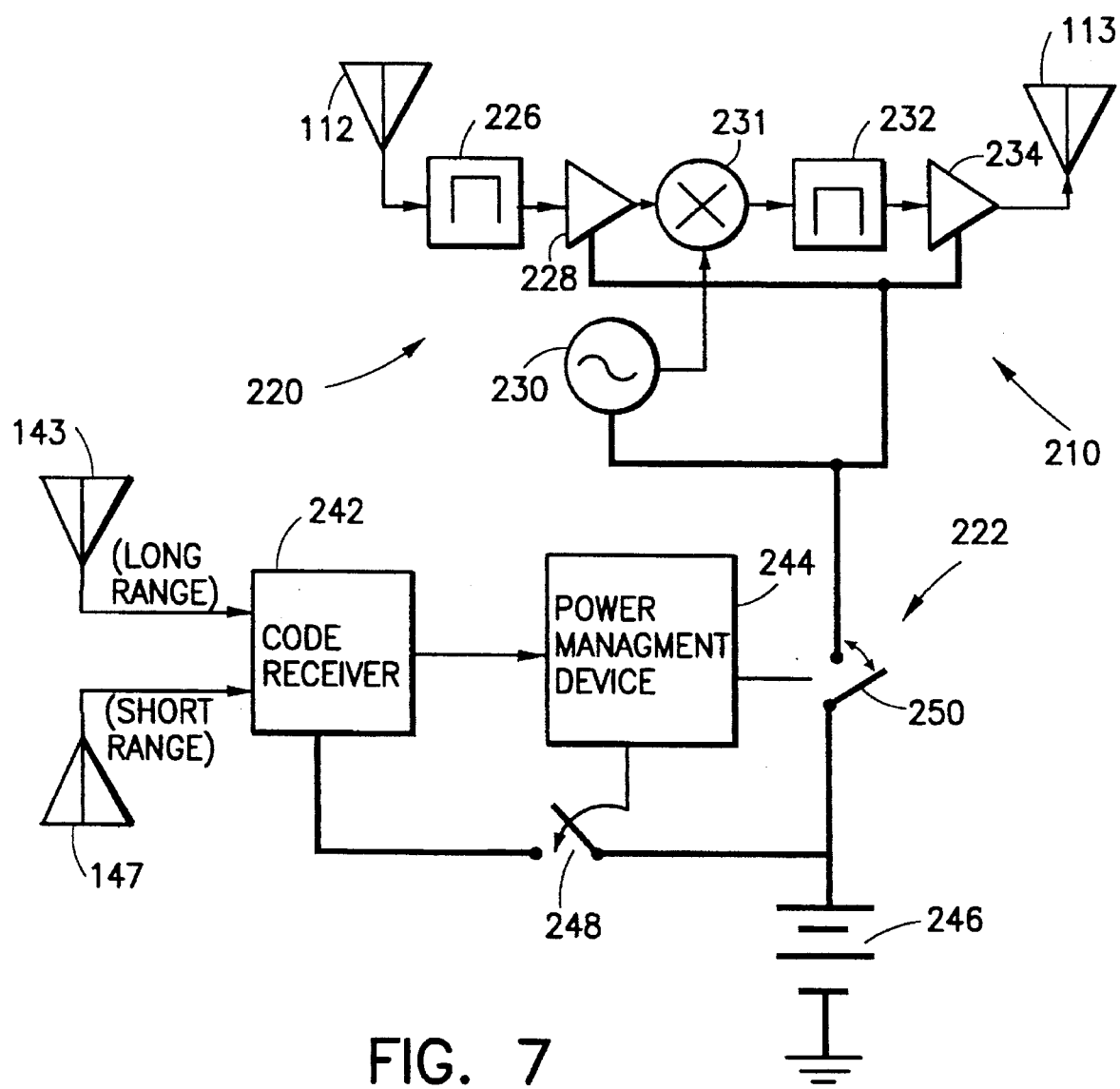
FIG. 7 is a schematic illustration of one embodiment of remote module 210, which is capable of being used in the FIG. 6 embodiment.

FIG. 7 illustrates a schematic diagram of one embodiment of the remote module 210 of FIG. 6 of the present invention. The remote module 210 includes a GPS interface portion 220 and a power management portion 222. The GPS interface portion 220 includes the GPS receive antenna 112, a GPS filter 226, a low noise amplifier 228, a local oscillator 230, a mixer 231, a transmission band filter 232, an output amplifier 234, and a GPS retransmit antenna 113 (which may use the same structure as the long range antenna 143.) The power management portion 222 includes the long range antenna 143, the short range antenna 147, a code receiver 242, a power management device 244, a power supply 246, a power management portion switch 248, and a GPS interface portion switch 250.

The GPS interface portion 210 receives a GPS input signal transmitted by the GPS transmitter 116 (located on the GPS satellites 114) using the GPS receive antenna 112, and retransmits a translated signal, the frequency of which is shifted by a certain frequency, but otherwise contains an identical bandwidth, etc. over the GPS retransmit antenna 113 in the following manner. The GPS input signal typically oscillates at a frequency of 1575.42 MHz. In this disclosure, the use of specific frequencies and elements are intended to be illustrative (and not limiting) in scope. The GPS input signal is received by the GPS receive antenna 112 and is applied to the GPS filter 226. The GPS filter 226 selects a GPS band and eliminates interference. The output signal of the GPS filter 226 is then passed into the low noise amplifier 228, which amplifies the signal while adding virtually no additional noise. The mixer 231 shifts the frequency of the GPS signal by the frequency of the local oscillator 230, resulting in an output signal at approximately 660 MHz. The transmission band filter 232 selects the output band and limits the noise bandwidth.

The output amplifier 234 amplifies the signal produced by the transmission band filter 232 to a level sufficient to overcome path losses between the remote module 210 and the interrogation unit 102. The GPS interface portion 220 of the remote module 210 uses considerably less expensive components than a distinct GPS receiver 219 located in each remote module 210. The present invention functions well utilizing a mixer, one or more oscillators, and filters located on each container, and one or two GPS receivers located at the interrogator unit 102. In view of the fact that one remote module 210 can be associated with each container the present invention provides considerable cost savings with equivalent performance.

Interrogation Unit Embodiments

Figure 8:
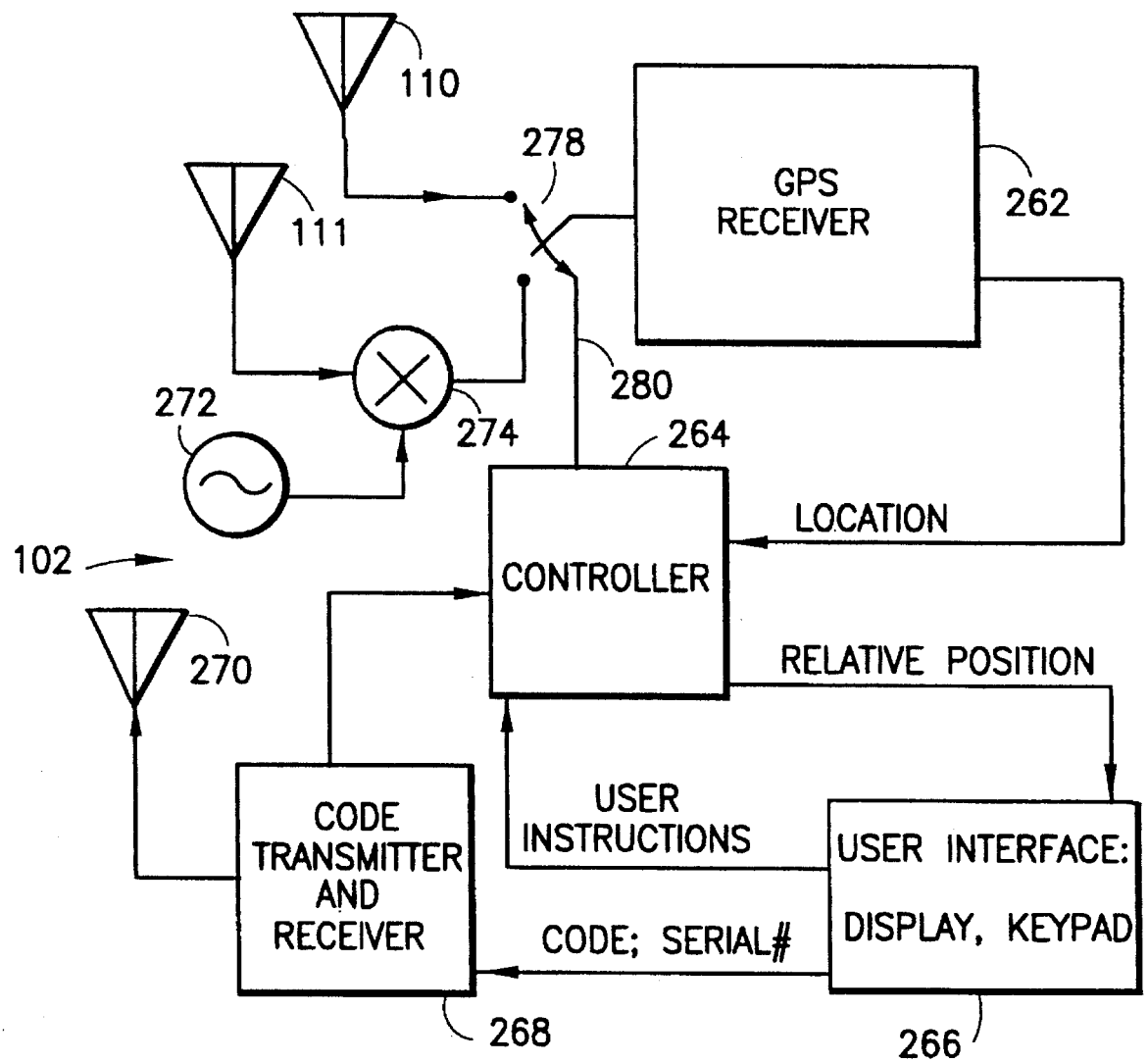
FIG. 8 is one embodiment of interrogator unit 102 which may be used in the stacked or nested container locator system illustrated in FIG. 6.
Figure 9:
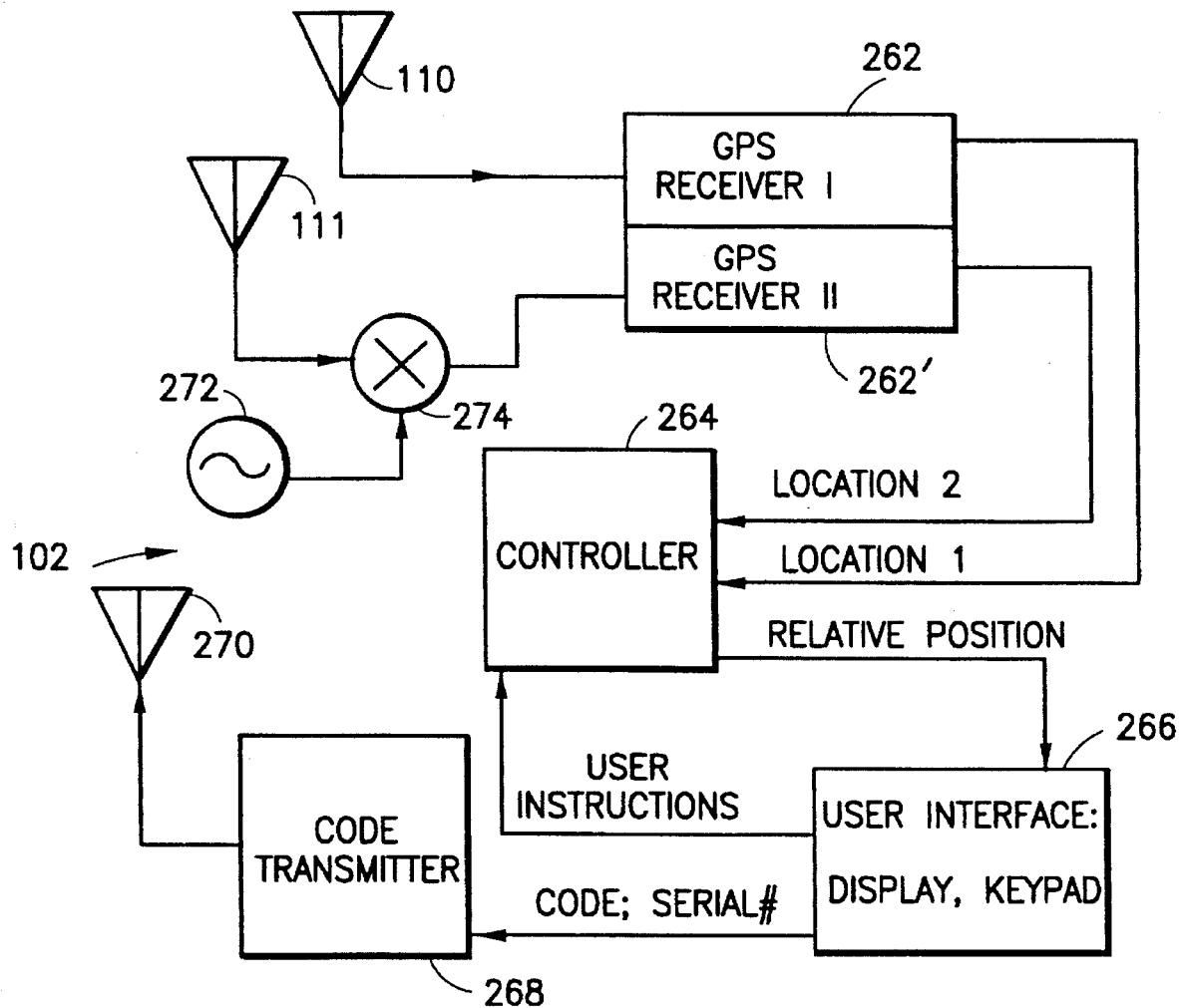
FIG. 9 is another embodiment of interrogator unit 102 which may be used in the stacked or nested container locator system illustrated in FIG. 6.
Figure 10:
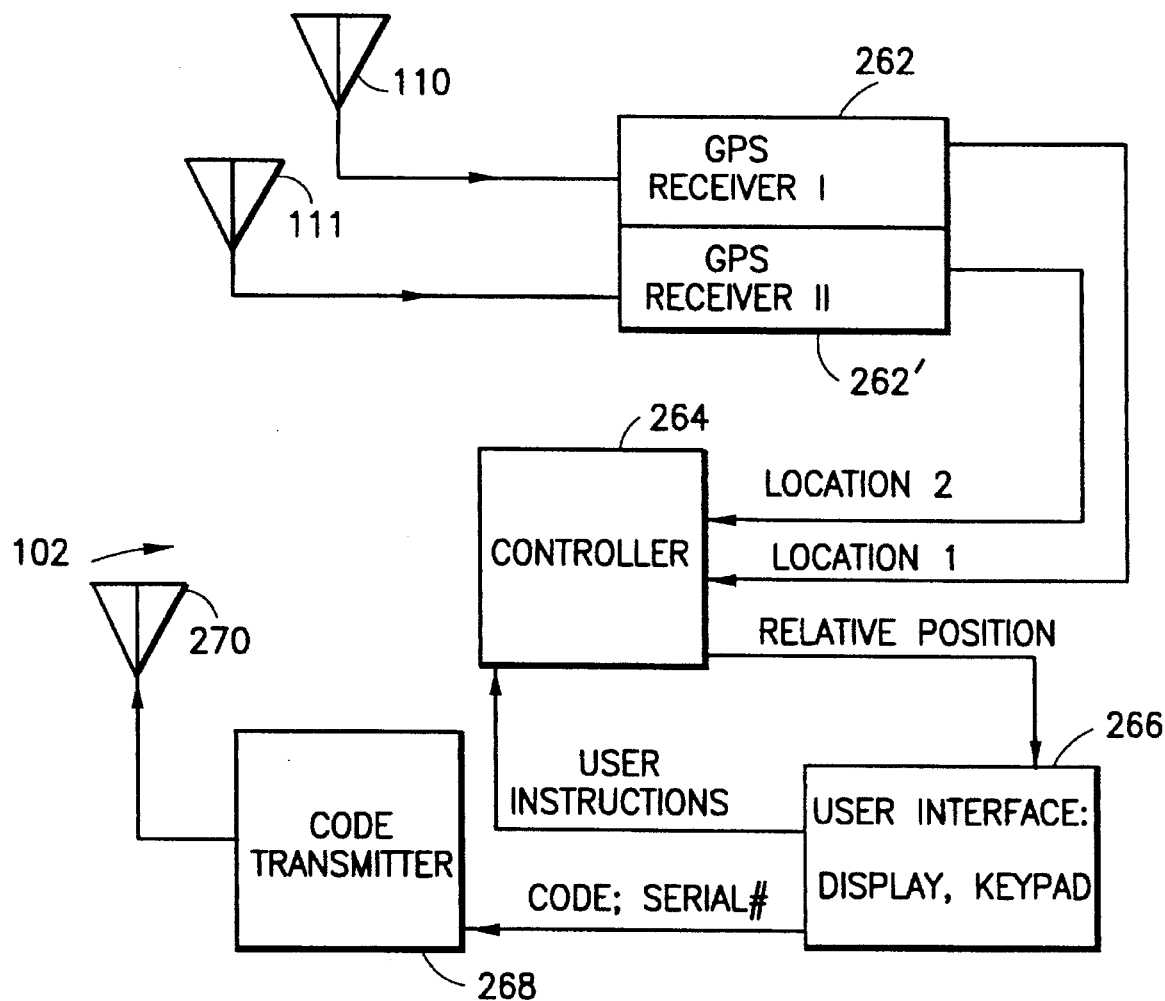
FIG. 10 is a final embodiment of interrogator unit 102 which may be used in the stacked or nested container locator system illustrated in FIG. 6.

Different embodiments of the interrogation unit 102 of FIG. 6 are illustrated in FIGS. 8, 9 and 10. The FIG. 8 embodiment includes the GPS antenna 110, a GPS receiver 262, a controller 264, a user interface 266, a code transmitter and receiver 268, a code band antenna 270, a local oscillator 272, a mixer 274, a retransmitted GPS band antenna 112, and an interrogation unit switch 278.

The GPS antenna 110 receives a direct GPS signal from GPS transmitters 116 located aboard at least four of the GPS satellites 114. The retransmitted GPS band antenna 111 receives a translated composite raw GPS signal from the GPS retransmit antenna 113 located aboard the remote module 210 of FIG. 7 (the transmitted composite raw GPS signal can be decoded to provide positional information of remote module 210.) The interrogation unit switch 278 switches the GPS receiver input between the GPS antenna 110 and the retransmitted GPS band antenna 111. The signal applied to the GPS receiver 262 may be applied by either the GPS antenna 110 or the retransmitted GPS band antenna 111. The controller 264 controls the operation of the switch 276. The user interface 266, which typically includes a display and a keyboard (not illustrated), regulates the operation of the controller 264 by selecting which remote module 210 to locate, and may utilize coded keyword for each article. For instance, if looking for aspirin, transmit the word "aspirin" to each master tag and each master tag will search for the term "aspirin" in its storage, and any matches of the word "aspirin" will be transmitted to the remote module.

The user interface is also in communication with the code transmitter 268 and receiver which formats and transmits a signal (via the code band antenna 270), as selected by the user interface. The code band antenna 270 is configured to be in direct electronic communication with the long range antenna 143 of FIG. 7. The user of the system inputs data into the user interface 266 which includes such specifics as the code or serial number of the remote module 210 of FIG. 7. That input code will then be sent to the code transmitter, and the coded signal will be transmitted over the code band antenna 270 to the long range antenna 143, at which point the signal will be treated as described previously with respect to the FIGS. 3a and 3b embodiment. It is also possible that this function will be performed continuously to monitor the location of all of the potentially lost articles in the region. Any return information from the code transceiver 242 of FIG. 7 will be received by the receiver portion of the code transmitter and receiver 268, which will apply the return information it received to the controller.

The interrogation unit 14 may be either a hand held unit, fixed within a tower, contained in a vehicle, or located in any other position suitable for the specific application. This invention has particular application in the transport of goods. The mobile unit may be combined with a vehicle navigation and communication system (known in the art), which could result in several features, including:

1. an in-cab display of the location of a particular shipment intended as a next load;
2. a direct transfer of the next load serial number or identification number, followed by an in-cab display of that load; and
3. the combination of several hardware elements (e.g. the same GPS receiver 262 used for vehicle navigation is used to indicate the position of the next load).

The mixer 274 acts to combine a carrier signal produced by the local oscillator 272 and the signal produced by the retransmitted GPS band antenna 112 in a similar manner to that produced by the low noise amplifier 228 and the local oscillator 230 of FIG. 7, as described previously.

In order to describe the interrelationship between the interrogation unit 102 and the remote module 210, it is necessary to consider one property of GPS known as selective availability. In view of the accuracy of GPS systems, governmental agencies have adopted selective availability in their GPS systems, in order to make the signals from any one GPS satellite vary with time. For example, the GPS information can vary as much as several hundred feet in a 30 second period. Therefore, it may be difficult for any GPS receiver (or translator) to determine its position accurately without outside additional information. Such outside information may include a second GPS receiver which is positioned at a known location that is also relatively close to the first receiver (or translator.) Both receivers receive the same signals from the GPS satellites, and both receivers experience approximately the same errors. Therefore, if the GPS receiver, which is at the non-fixed position, is able to determine it's position relative to the GPS satellite, it can also determine the error induced in the fixed receiver (by comparing the known position of the fixed receiver compared to the indicated position of the fixed receiver.) The non-fixed receiver can then correct its own position by applying the same error, and the non-fixed receiver (or translator) obtains accurate positional information. This process is known as relative GPS, the fundamentals of which is known in the art.

There are at least three embodiments of the interrogation unit associated within the above translator scheme. A first embodiment is illustrated in FIG. 8 in which the interrogation unit switch 278 is switched such that the GPS receiver receives a signal, via GPS antenna 110, directly from a GPS satellite receives a signal, via the retransmitted GPS band antenna 112, from the remote unit 210 (translator.) A second embodiment, as illustrated in FIG. 9, is identical to the FIG. 8 embodiment except that there are two GPS receivers 262 and 262' (there is no need to provide the interrogation unit switch 278 of FIG. 8.) The controller 264 receives a constant input of position information from both GPS receivers 262, 262', and is able to compute the position of the remote unit in much the same manner as described with respect to the FIG. 8 embodiment using relative GPS.

In both of these embodiments, the GPS receiver receives GPS data of two frequencies. The first frequency is the direct frequency (as transmitted by the GPS transmitter on the satellite), and the second frequency is the translated frequency (the frequency modification caused by the remote module 210.)

A third embodiment of the present invention, as illustrated in FIG. 10, is identical to the FIG. 9 embodiment except that the local oscillator 272 and the mixer 274 are removed. In the FIG. 10 embodiment, the GPS receivers 262 and 262' receive two signals which are at different frequencies to avoid interference therebetween, and therefore the controller 264' software becomes simpler in not having to compensate for the different frequencies.

The above teachings are illustrations of preferred embodiments of the present invention. It should be noted that modifications to the invention, such as would occur to those of ordinary skill in the art, are also within the intended scope of the present invention.

What is claimed is:

1. An apparatus for locating an object contained within a group of objects, comprising:

an electronic tag for being positioned in close proximity relative to an object, said electronic tag comprises at least one long range transceiver portion having a long range antenna, and a separate at least one short range transceiver portion having a short range antenna; each long range transceiver portion for communicating, as a function of position of the object relative to other objects, with one of a short range transceiver portion of another electronic tag and an interrogator unit; each short range transceiver portion for communicating with a long range transceiver portion of another electronic tag.

2. The apparatus as described in claim 1, wherein said objects are containers.

3. The apparatus as described in claim 2, wherein:

a first one of the containers has at least one associated electronic tag comprising a short range transceiver portion having a short range antenna for transmitting a signal to a long range antenna of a long range transceiver portion associated with an adjacent second one of the containers.

4. The apparatus as described in claim 1, wherein said objects are containers that are capable of being stored in a nested configuration.

5. An apparatus as described in claim 4, wherein a first one of the containers has at least one of the other containers nested therein, said first one of the containers has at least one associated electronic tag comprising a short range transceiver portion having a short range antenna for communicating with a long range antenna of a long range transceiver portion associated with said at least one of the other containers.

6. The apparatus as described in claim 1, in which the electronic tag further comprises:

means for providing positional information for said electronic tag.

7. The apparatus as described in claim 6, wherein said means for providing positional information comprises a GPS translator for providing GPS positional information relating to at least one electronic tag.

8. A method for providing at least one stack of objects, each object having an affixed electronic tag, wherein an electronic tag of only one object of the at least one stack is positioned to communicate with an interrogator, comprising the steps of:

affixing individual ones of a plurality of electronic tags to individual ones of a plurality of objects; and stacking said plurality of objects in at least one column such that only one electronic tag that is affixed to an object stacked in each of the at least one columns is able to receive signals from an interrogator, wherein the one electronic tag is considered to be a master electronic tag, and wherein each other one of the plurality of electronic tags is considered to be a slave electronic tag, and wherein each electronic tag that is affixed to an object is for communicating information to an electronic tag of an adjacent object over one of a short range antenna and a long range antenna.

9. The method as described in claim 8, wherein said information further comprises GPS positional information of at least one of said electronic tags.

10. The method as described in claim 8 wherein the step of stacking further comprises the step of:

stacking the objects in a manner such that each individual one of the electronic tags that is affixed to a respective individual one of the plurality of objects is able to communicate with an electronic tag that is affixed to an adjacent one of the plurality of objects, and further comprising the steps of:

transmitting an interrogator signal in the direction of the master electronic tag of at least one of the columns;

within each of the at least one columns, where an interrogator signal is received by at least one electronic tag affixed to one of the plurality of objects, emitting a slave signal from the at least one electronic tag to another electronic tag that is affixed to an adjacent one of the plurality of objects, wherein the slave signal disables a responsiveness of the another electronic tag to the interrogator signal.

11. The method as described in claim 8, wherein each electronic tag that is affixed to an object communicates information relating to the object to an electronic tag of an adjacent object.

12. The method as set forth in claim 8, wherein each electronic tag that is affixed to an object communicates information relating to positional characteristics of the object to an electronic tag of an adjacent object.

13. The method as set forth in claim 8, wherein the master electric tag is able to receive signals from an interrogator and to transmit information, associated with at least one of the electronic tags, to the interrogator.

14. An inventory method comprising the steps of:

affixing individual ones of a plurality of electronic tags to corresponding individual ones of a plurality of objects, each respective electronic tag having a long range antenna portion and a separate short range antenna portion;

nesting said objects within a larger nesting container, the nesting container having an interrogator unit;

applying an interrogatory signal to said nesting container, wherein said interrogator unit is considered to be a master electronic tag; while all of the electronic tags associated with the objects are considered to be slave electronic tags; and communicating information from said slave electronic tags to said interrogator unit in response to a signal received from said interrogator unit, wherein the long range antenna portion of at least one of the plurality of electronic tags is for communicating with said interrogator unit, and wherein the short range antenna portion of said at least one of the plurality of electronic tags is for communicating with the long range antenna portion of an adjacent one of said plurality of electronic tags.

15. The method as described in claim 14, further comprising the step of:

providing a self-inventory signal, wherein the interrogator unit gains its identity, and the slave electronic tag gains its identity.

16. The method as described in claim 14, further comprising the step of:

transferring positional GPS information relating to the interrogator unit to a remote interrogator unit.

17. The method as described in claim 14, wherein the step of communicating further comprises the step of:

communicating information from at least one slave electronic tag, the information relating to an object to which said at least one slave electronic tag is affixed.

18. The method as described in claim 17, wherein said information relates to the contents of the object to which said at least one electronic tag is affixed.

19. A method of selecting master electronic tags from a group of electronic tags, comprising the steps of:

mounting individual ones of a plurality of electronic tags to individual ones of a plurality of objects, each electronic tag comprising a long range antenna and a short range antenna stacking said objects to form a stack, wherein each long range antenna is in close proximity to a short range antenna of an adjacent electronic tag, excepting for one which is adjacent to an exposed surface of said stack;

applying a first signal which is received by a plurality of electronic tags, said first signal causing each tag which receives said first signal to transmit a slave signal over its short range antenna, said slave signal is transmitted in such a manner that it can only be received by a long range antenna which is affixed to an adjacent tag from the tag associated with the short range antenna which is transmitting the slave signal; and monitoring signals over said long range antennas to determine which long range antennas are not receiving a slave signal, any electronic tag which does not receive a slave signal after it receives the first signal will be considered to be a master electronic tag, while each electronic tag which receives a slave signal will be considered to be a slave electronic tag.

20. A method of transferring information from a first slave electronic tag to a master electronic tag, the first slave electronic tag being attached to a first object, the master electronic tag being attached to a second object, each of the master electronic tag and the first slave electronic tag comprising at least one long range antenna and a separate at least one short range antenna, comprising the steps of:

providing a self inventory command to the master electronic tag;

issuing a first slave command from said short range antenna of said master electronic tag to said long range antenna of said first slave electronic tag, thereby establishing a communication link between said master electronic tag and said first slave electronic tag upon the reception of said first slave command by said first slave electronic tag; and transferring first data relating to said first slave electronic tag, from said long range antenna of said first slave electronic tag to said short range antenna of said master electronic tag.

21. The method described in claim 20, further comprising the steps of:

issuing a second slave command from said short range antenna of the first slave electronic tag to a long range antenna of a second slave electronic tag; and transferring second data relating to the second slave electronic tag from said long range antenna of the second slave electronic tag to said short range antenna of the first slave electronic tag.

22. The method described in claim 21, further comprising the step of:

transferring the second data from said long range antenna of said first slave electronic tag to said short range antenna of said master electronic tag.

23. The method as described in claim 22, wherein said self inventory command is transmitted from an interrogator unit.

24. The method as described in claim 23, further comprising the step of:

transferring said first data from said master electronic tag to said interrogator unit.

25. The method as described in claim 23, further comprising the steps of:

transferring said second data from said master electronic tag to said interrogator unit.

26. The method as described in claim 22, wherein said second data contains the second slave electronic tag's inventory contents.

27. The method as described in claim 20, wherein said first data contains the first slave electronic tag's inventory contents.

* * * * *